(12) United States Patent
Iwatsuki (10) Patent No.: US 6,502,948 B2
(45) Date of Patent: Jan. 7, 2003

(54) SURFACE LIGHTING DEVICE (75) Inventor: Nobuo Iwatsuki, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/956,818

(22) Filed: Sep. 21, 2001

(65) Prior Publication Data

US 2002/0034072 A1 Mar. 21, 2002

(30) Foreign Application Priority Data

Sep. 21, 2000 (JP) ........................................ 2000-287380

(51) Int. Cl.[7] ................................................. F21V 7/04
(52) U.S. Cl. ............................. 362/31; 362/26; 362/27; 362/329; 362/551; 362/555; 362/558
(58) Field of Search .............................. 362/31, 26, 27, 362/329, 551, 555, 558

(56) References Cited

U.S. PATENT DOCUMENTS 6,375,335 B1 * 4/2002 Tabata et al. ................. 362/26
2002/0036900 A1 * 3/2002 Suzuki et al. ................. 362/31
2002/0057562 A1 * 5/2002 Sasako et al. ................ 362/31

* cited by examiner

Primary Examiner—Sandra O'Shea
Assistant Examiner—al. Tsidulko
(74) Attorney, Agent, or Firm—Arent Fox Kintner Plotkin & Kahn, PLLC (57) ABSTRACT

A surface lighting device includes a stick type light guide body. The stick type light guide body receives a light emitted from a light emitting surface of an LED fixed on a substrate from a side surface which faces to the LED and emits the received light from a side surface which faces to a light guide plate. The emitted light is incident from a side surface of the light guide plate and is emitted from an upper surface of the light guide plate. Then, the substrate is formed with a through hole, and the stick light guide is formed with a protrude portion on the lower surface thereof. By fitting the protrude portion into the through hole, the LED and the stick type light guide body are relatively positioned such that the light emitting surface of the LED and the side surface of the stick light guide are brought into close contact with each other.

5 Claims, 13 Drawing Sheets

SURFACE LIGHTING DEVICE

BACKGROUND OF THE INVENTION

1. Field of the Invention

This invention relates to a surface lighting device. More particularly, the present invention relates to a frontlight type surface lighting device for emitting a light to a reflective type liquid crystal panel.

2. Description of the Prior Art

An example of this kind of a surface lighting device is disclosed in a Japanese Patent Laying-open No.2000-89225 (G 02F 1/1355) laid-open on Mar. 31, 2000. In such a prior art, by forming a predetermined angle between a longitudinal direction of a linear prism formed in plural on the upper surface of a light guide plate and a vertical direction of a pixel pattern of a reflective type liquid crystal display element, the occurrence of moire fringes due to the interference of the prism and the pixel pattern of the reflective type liquid crystal display element is intended to be prevented.

Meanwhile, another example of a surface lighting device is disclosed in a Japanese Patent Laying-open No.2000-11723 (F21V8/00) laid-open on Jan. 14, 2000. This prior art, not a frontlight type, enables improvement of impact-resistance and low voltage drive by use of a point light source and a stick type light guide body in place of a fluorescent lamp used as a linear light source.

On the assumption that such two surface lighting devices are combined with each other, a frontlight type surface lighting device which is improved in impact-resistance and a voltage drive characteristic and does not cause moiré fringes can be obtained.

However, if a gap is caused between a point light source and a stick type light guide body by the positioning at the time that the point light source and the stick light body are mounted on a substrate, a light leaked from the gap is directly incident to a light guide plate, causing an illuminated line on the upper surface of the light guide plate. That is, the illuminated line appears in the direction orthogonal to the prism due to the light leakage.

SUMMARY OF THE INVENTION

Therefore, it is a primary object of the present invention to provide a novel surface lighting device.

It is another object of the present invention to provide a surface lighting device capable of decreasing light leakage occurring between a point light source and a stick type light guide body.

A surface lighting device according to the present invention comprises: a point light source which is fixed on a substrate; a stick type light guide body which receives a light emitted from a light-emitting surface of said point light source from an end surface in the longitudinal direction and emits the received light from a side surface in the longitudinal direction; and a light guide plate which receives the light emitted from the stick type light guide body from a first side surface and emits the received light from an upper surface; wherein one of a fitting concave portion and a fitting protruding portion is formed on a predetermined position of the substrate, the other of the fitting concave portion and the fitting protruding portion is formed on a predetermined position of the stick type light guide body, and the point light source and the stick type light guide body are relatively positioned by fitting the fitting protruding portion into the fitting concave portion.

By fitting one of the fitting concave portion and the fitting protruding portion formed on a predetermined position of the substrate into the other of the fitting concave portion and the fitting protruding portion formed on a predetermined position of the stick type light guide body, a relative position between the point light source and the stick type light guide body is determined. Accordingly it is possible to bring the end surface of the stick type light guide body in the longitudinal direction close to the light emitting surface of the point light source, and therefore it is possible to decrease the light leakage occurring from the gap between the light emitting surface and the end surface in the longitudinal direction.

If the fitting concave portion is formed on the upper surface of the substrate, and the fitting protruding portion is formed on the lower surface of the stick type light guide body, transmission of the light incident to the stick type light guide body is never blocked by the fitting protruding portion.

Meanwhile, if the one of the fitting concave portion and the fitting protruding portion is formed in the vicinity of the point light source, and the other of the fitting concave portion and the fitting protruding portion is formed in the vicinity of the end surface of the stick type light guide body in the longitudinal direction, assembly of the surface lighting device will become easy.

Furthermore, on the assumption that the stick type light guide body is arranged in parallel to the first side surface of the light guide plate, and the light emitting surface of the point light source is arranged outside the second side surface of the light guide plate orthogonal to the first side surface in the vicinity of the point light source, even if light leakage occurs between the light emitting surface and the end surface in the longitudinal direction, optical intensity can be decreased by the time the leaked light is reached to the first side surface of the light guide plate.

It is noted that it will be appropriate a linear prism being in parallel to a line crossing the first side surface and the second side surface is formed on the upper surface of the light guide plate.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
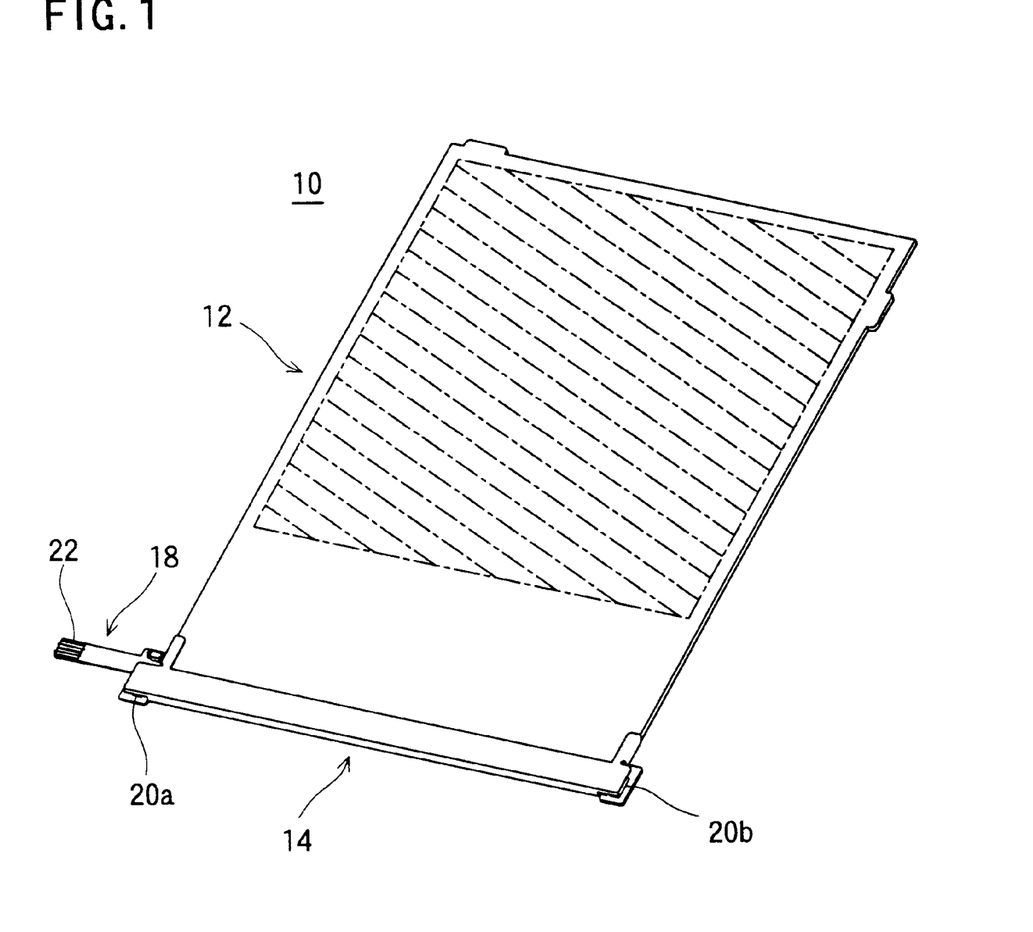
FIG. 1 is a perspective view showing one embodiment of the present invention.
Figure 2:
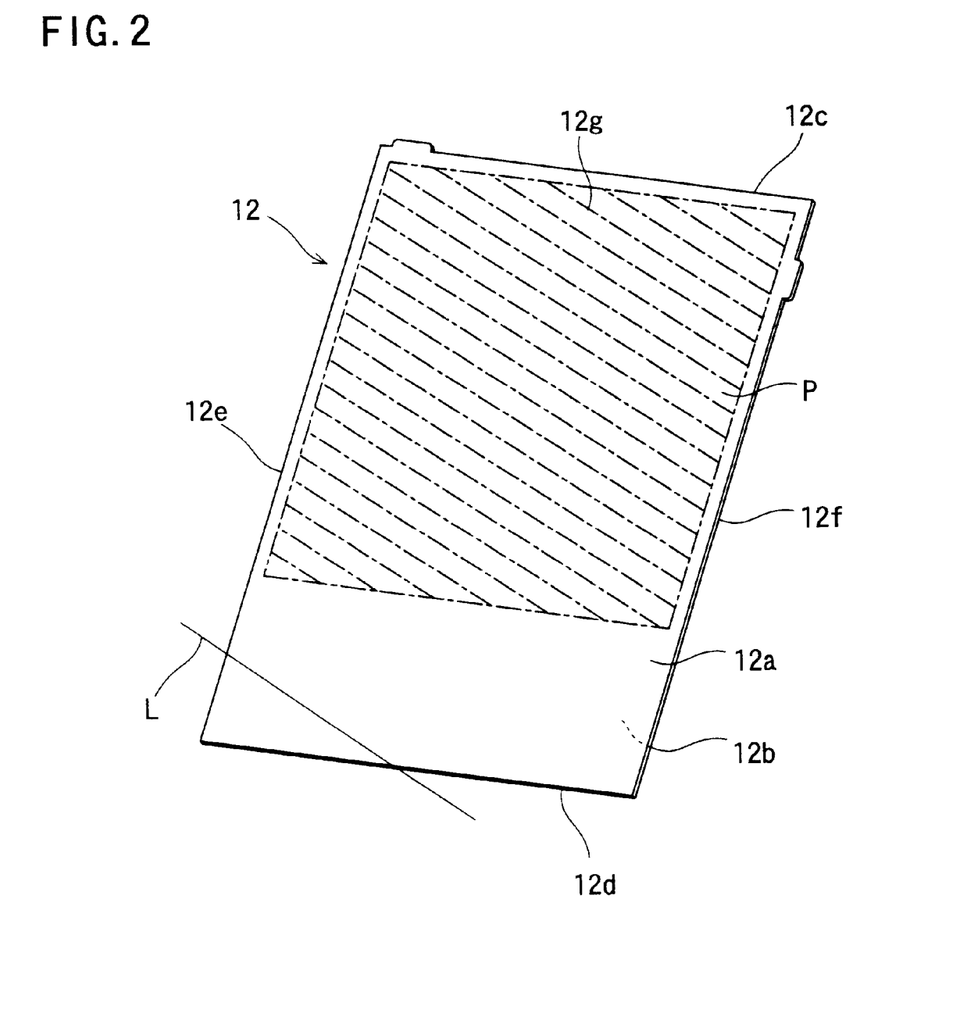
FIG. 2 is a perspective view of a light guide plate.
Figure 3:
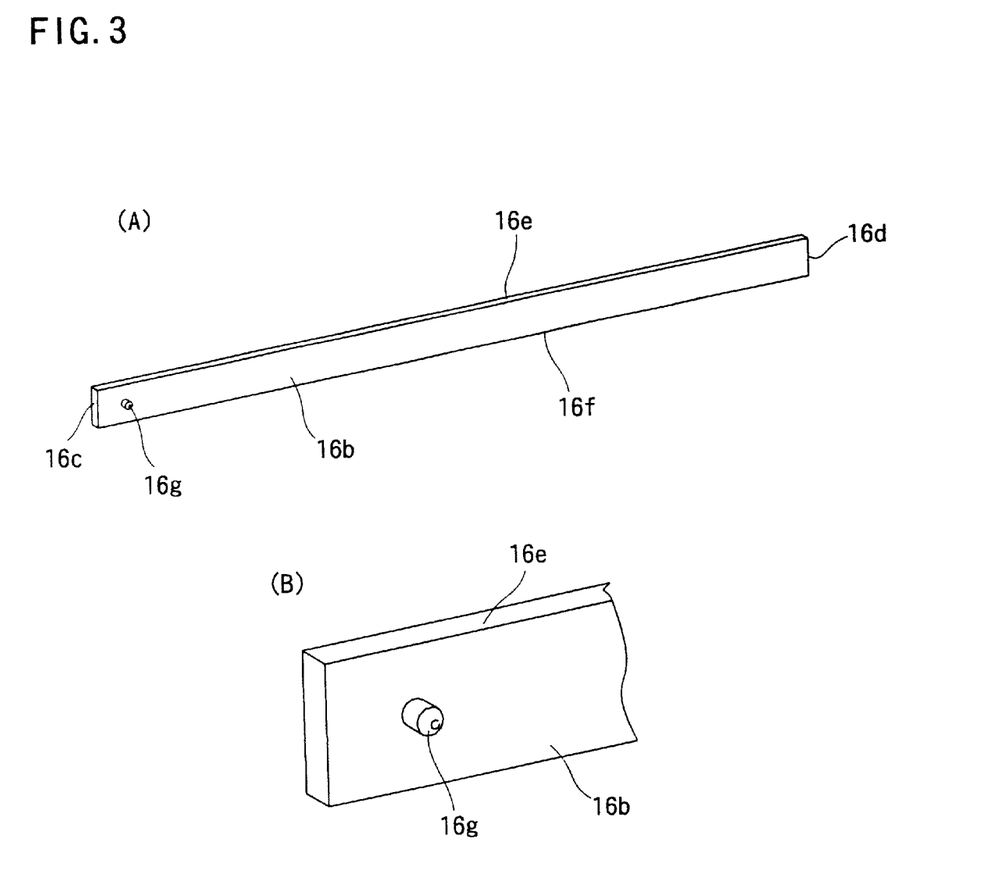
FIG. 3(A) is a perspective view of a stick type light guide body.
FIG. 3(B) is an enlarged scale perspective view of a part of the stick type light guide body.

A surface lightning device 10 of this embodiment shown in FIG. 1 is a frontlight type lightning device, and is constructed by a light guide plate 12 shown in FIG. 2, a stick type light guide body 16 shown in FIG. 3(A), FIG. 3(B) and FIGS. 4(A)–(C), a reflector 14 shown in FIG. 5(A), FIG. 5(B) and FIGS. 6(A)–(D), and a substrate 18 shown in FIG. 7(A), FIG. 7(B) and FIGS. 8(A)–(D). It is noted the substrate 18 has mounted with LEDs 20a and 20b.

Referring to FIG. 2, the light guide plate 12 is made of a polycarbonate resin or an acrylic resin being a transparent resin. The light guide plate 12 has an upper surface 12a and lower surface 12b in rectangular form, and has a cross-section in wedged or rectangular form when viewed from side surfaces 12c and 12f. Each of the angle which the side surface 12c forms with a side surface 12e, the angle which the side surface 12c forms with the side surface 12f, the angle which the side surface 12f forms with a side surface 12d, and the angle which the side surface 12d forms with a side surface 12e is approximately 90 degrees. A prism surface 12g constructed by a plurality of linear prisms P is formed on the center of the upper surface 12a little nearer the side surface 12c. Each linear prism P extends in the oblique direction with respect to the side surface 12d, and the longitudinal direction of the linear prism P is in parallel to the line L crossing the side surface 12e and the side surface 12d.

Referring to FIG. 3(A), FIG. 3(B) and FIGS. 4(A)–(C), the stick type light guide body 16 is also formed of a polycarbonate resin or an acrylic resin being a transparent resin. The stick type light guide body 16 has an upper surface 16a and a lower surface 16b being in parallel each other, and has side surfaces 6c–16f forming an angle of 90 degrees with respect to the upper surface 16a and the lower surface 16b, and the side surfaces 16c and 16d forming an angle of 90 degrees with respect to the side surfaces 16e and 16f. The length of the stick type light guide body 16, i.e. the distance from the side surface 16c to the side surface 16d approximately coincides with the width of the light guide plate 12, i.e. the distance from the side surface 12e to the side surface 12f, and is specifically 60.1±0.3 mm (±0.3 mm is a tolerance). The upper surface 16a of the stick type light guide body 16 is overall formed in flat, and the lower surface 16b is formed in flat except for a protruding portion 16g formed in the vicinity of the side surface 16c. The protruding portion 16g is cylindrical in shape, and 0.5 mm to 0.6 mm in diameter. That is, a tolerance of the diameter is −0.1 mm. Meanwhile, the distance from the side surface 16c to the protruding portion 16g is 1.5 mm to 1.6 mm. That is, a tolerance of the distance is also −0.1 mm.

Referring to FIGS. 5(A), FIG. 5(B) and FIGS. 6(A)–(C), the reflector 14 is made of a metal such as a stainless, a brass or aluminum, and includes plate type reflective portions 14a–14c. The reflective portions 14a and 14b are connected by the reflective portion 14c, and the reflective portions 14a and 14b have a cross-section in the longitudinal direction in approximately U-shaped form. Both ends of the reflective portions 14a and 14c in the longitudinal direction protrude outward than the reflective portion 14b. In the vicinity of the both ends of the reflective portion 14a in the longitudinal direction, support portions 14d and 14e for supporting the light guide plate 12 are formed, and at the one end of the reflective portion 14b in the longitudinal direction (side of support portion 14d), a notch 14g is formed to engage with the protruding portion 16g of the stick type light guide body 16.

The support portions 14d and 14e, part of which bend at a 90 degrees angle, extend in the same direction orthogonal to the longitudinal direction of the reflective portion 14a. Due to this, the support portions 14d and 14e have approximately L-shaped cross-sections in the longitudinal direction so as to enclose the light guide plate 12. The distance between the bending portions of the support portions 14d and 14e is equal to the width of the light guide plate 12. The light guide plate 12 is supported by the support portions 14d and 14e at the side surfaces 12e and 12f.

Figure 5:
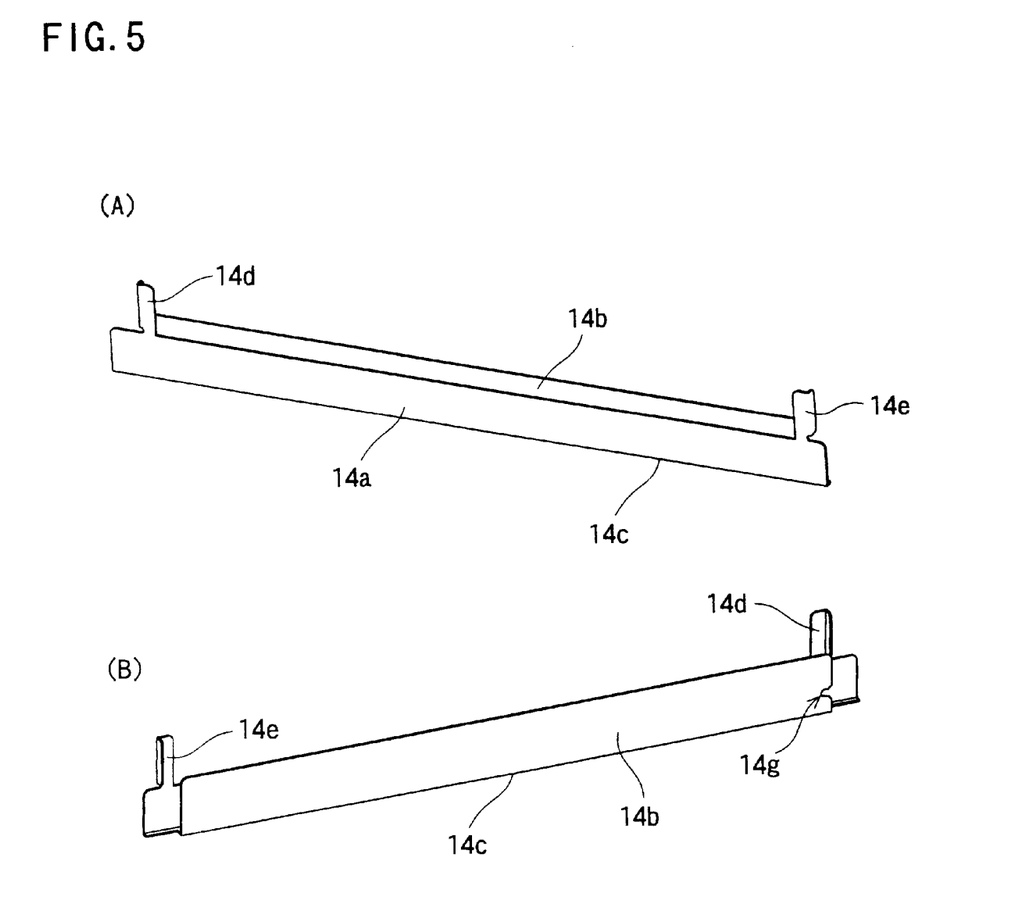
FIG. 5(A) is a perspective view of a reflector when the upper surface is viewed from an oblique direction.
FIG. 5(B) is a perspective view of the reflector when the lower surface is viewed from an oblique direction.
Figure 6:
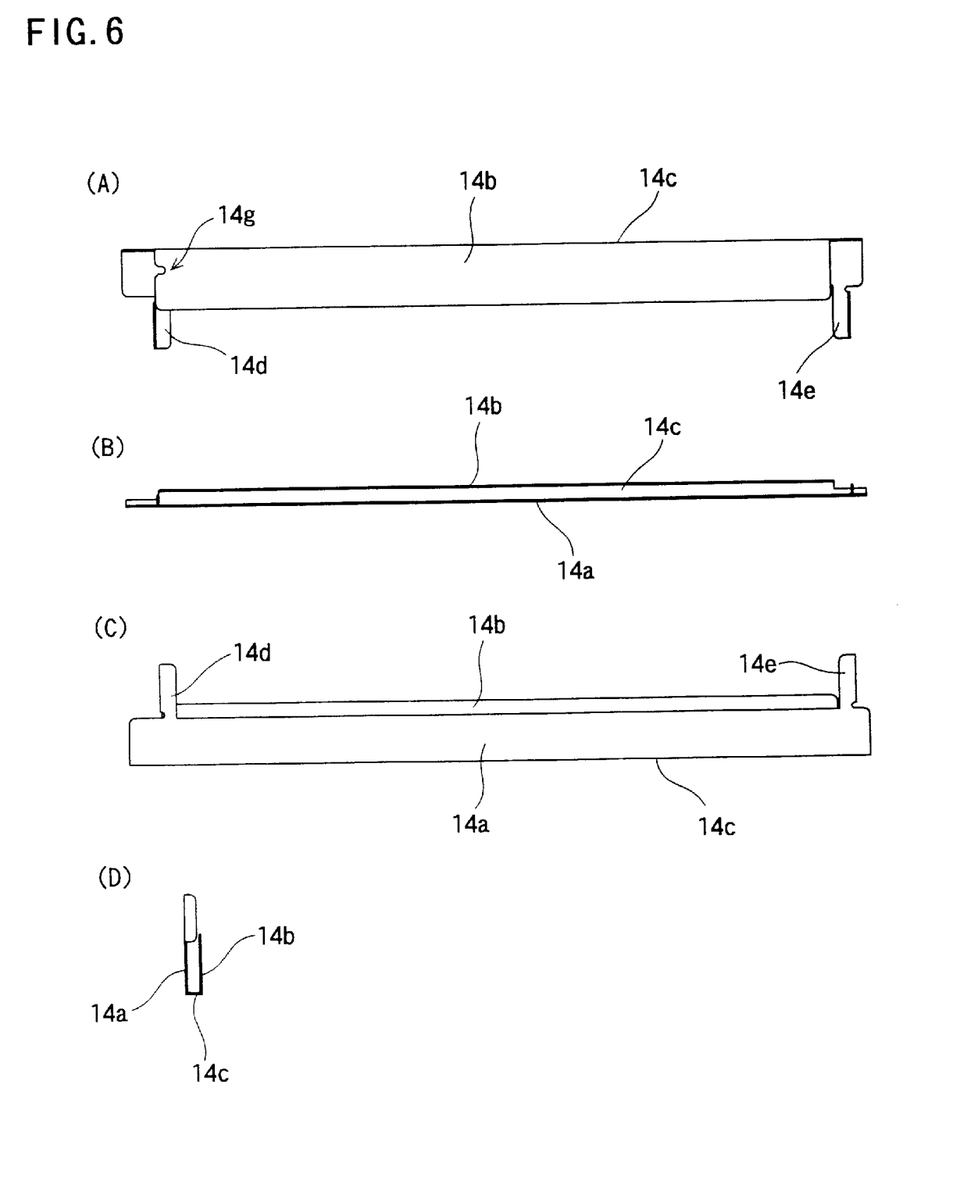
FIG. 6(A) is a lower surface view of the reflector.
FIG. 6(B) is a side view of the reflector.
FIG. 6(C) is an upper surface view of the reflector.
FIG. 6(D) is another side view of the reflector.

It is noted that the reflective portions 14a–14c and the support portions 14d and 14e are integrally formed. Meanwhile, upon viewing the reflector 14 from the top, the support portion 14d is provided in the position of striding the one end of the reflective portion 14b in the longitudinal direction, and the support portion 14e is provided outside the reflective portion 14b.

Referring to FIGS. 7(A), 7(B) and FIGS. 8(A)–8(D), the substrate 18 comprises a mount portion 18a for mounting the LED 20a and a Zener diode 26, a mount portion 18b for mounting the LED 20b, a mount portion 18c for mounting the reflector 14, and an electrode forming portion 18d for forming an electrode 22 conducting to the LEDs 20a and 20b. The mount portions 18a and 18b are respectively connected to the both ends of the mount portion 18c, and the electrode forming portion 18d is connected to the mount portion 18a. It is noted that the mount portions 18a–18c and the electrode forming portion 18d have upper surfaces and lower surfaces in flat shape.

The LEDs 20a and 20b are respectively mounted on the mount portions 18a and 18b in such a manner that each light emitting surface E1 and E2 is orthogonal to the longitudinal direction of the mount portion 18c and opposite to each other. When the LEDs 20a and 20b are mounted, the distance from the light emitting surface E1 to the light emitting surface E2 is 60.3±0.3 mm (±0.3 mm is a tolerance). In the vicinity of the LED 18a on the mount portion 18c, a through hole 18e having diameters of 0.6 to 0.7 mm (a tolerance is +0.1 mm) is formed. The distance from the center of the through hole 18e to the light emitting surface E1 of the LED 20a is 1.6 to 1.7 mm (a tolerance is +0.1 mm). The mount portion 18c except for the through hole 18e is attached with a plurality of double-stick tapes 24. The mount portions 18a and 18b have reinforcing plates 28a and 28b for reinforcing the substrate 18 on the lower surface. It is noted the Zener diode 26 is provided to protect the LEDs 20a and 20b.

When manufacturing the surface lighting device 10 shown in FIG. 1, the stick type light guide body 16 is firstly fit to the reflector 14. At this time, by engaging the protruding portion 16g of the stick type light guide body 16 with the notch 14g of the reflector 14, the stick type light guide body 16 and the reflector 14 are relatively positioned.

Figure 7:
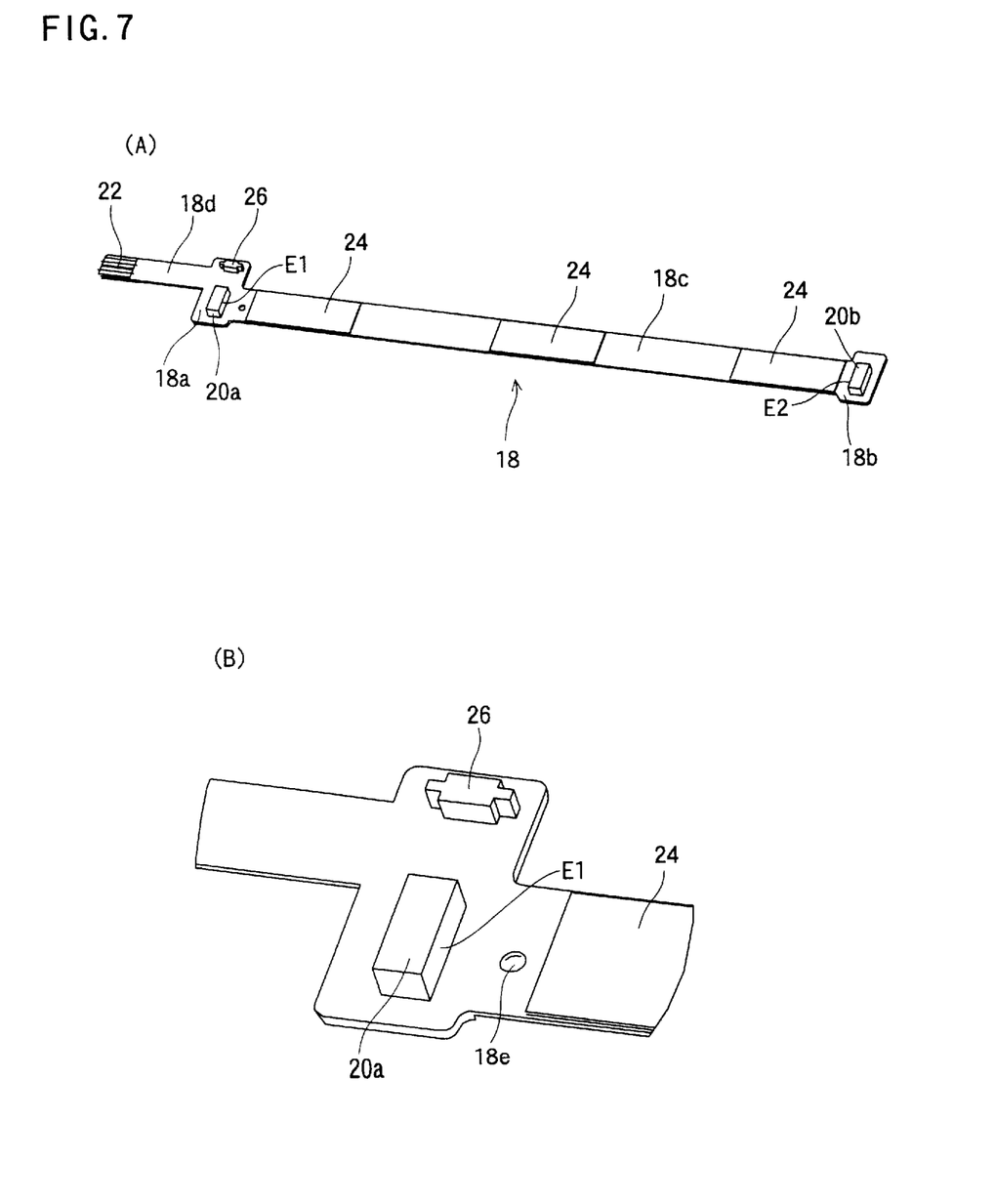
FIG. 7(A) is a perspective view of a substrate.
FIG. 7(B) is an enlarged scale perspective view of a part of the substrate.
Figure 8:
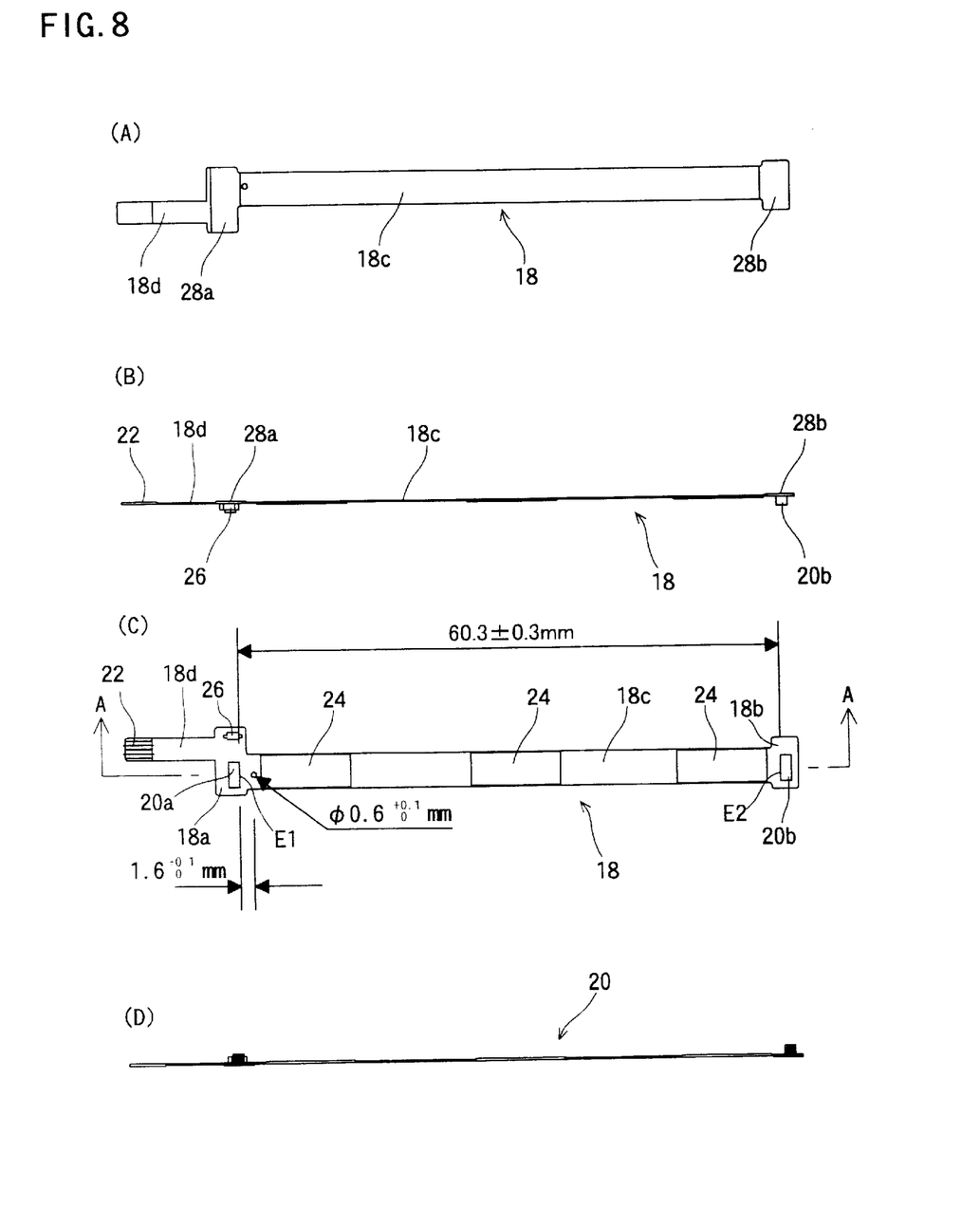
FIG. 8(A) is a lower surface view of the substrate.
FIG. 8(B) is a side view of the substrate.
FIG. 8(C) is an upper surface view of the substrate.
FIG. 8(D) is a cross-sectional view of the substrate at the line A—A.

Successively, as shown in FIG. 7 and FIG. 8, preparing for the substrate 18 mounted with the LEDs 20a and 20b, the reflector 14 fitting with the stick type light guide body 16 is mounted thereon. Specifically, the reflective portion 14b of the reflector 14 is attached to the mount portion 18c by the double-stick tape 24, and the protruding portion 16g protruding from the notch 14g is fitted into the through hole 18e formed on the mount portion 18c.

Figure 9:
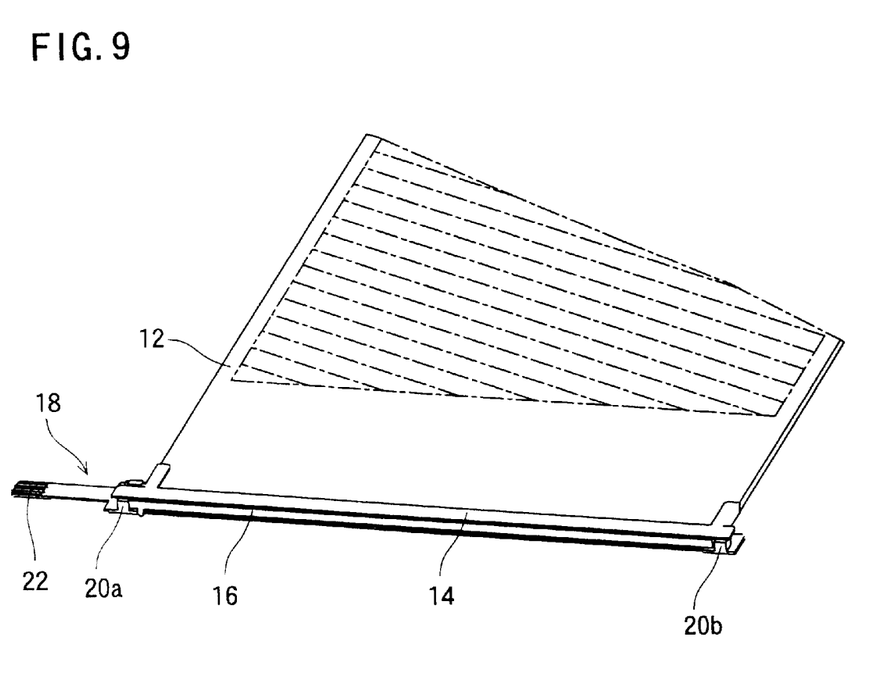
FIG. 9 is a cross-sectional view showing a major portion of FIG. 1 embodiment.
Figure 10:
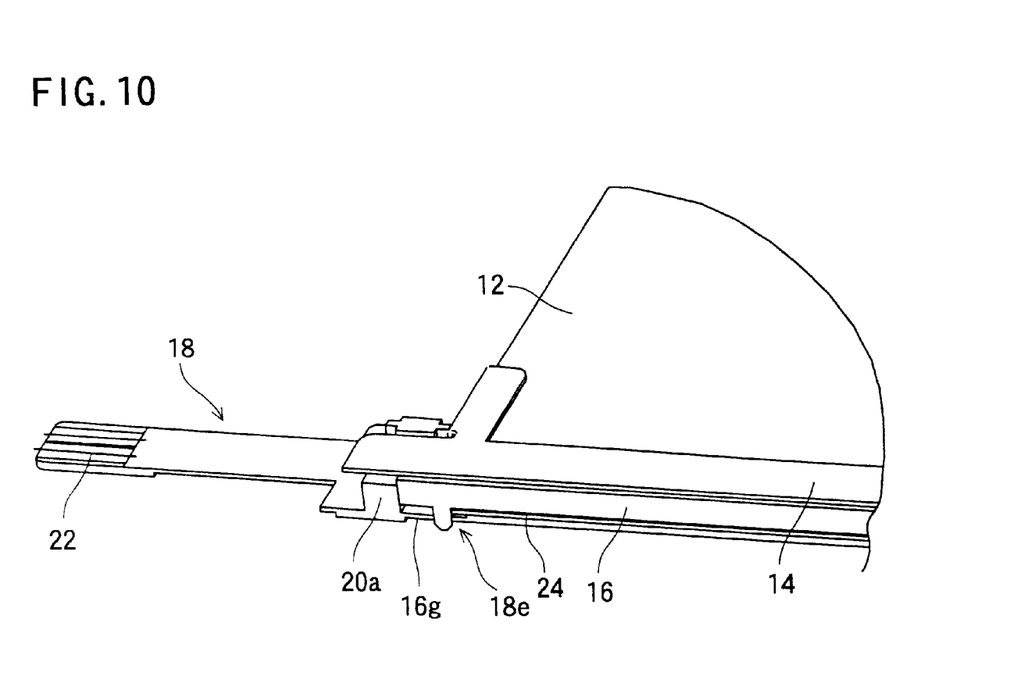
FIG. 10 is another cross-sectional view showing a major portion of FIG. 1 embodiment.
Figure 11:
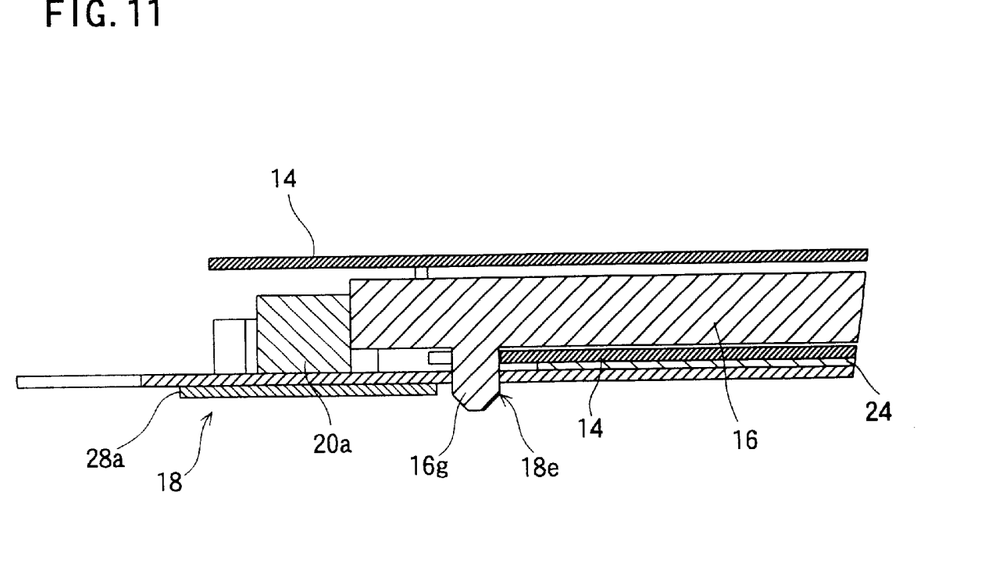
FIG. 11 is a further cross-sectional view showing a major portion of FIG. 1 embodiment.
Figure 12:
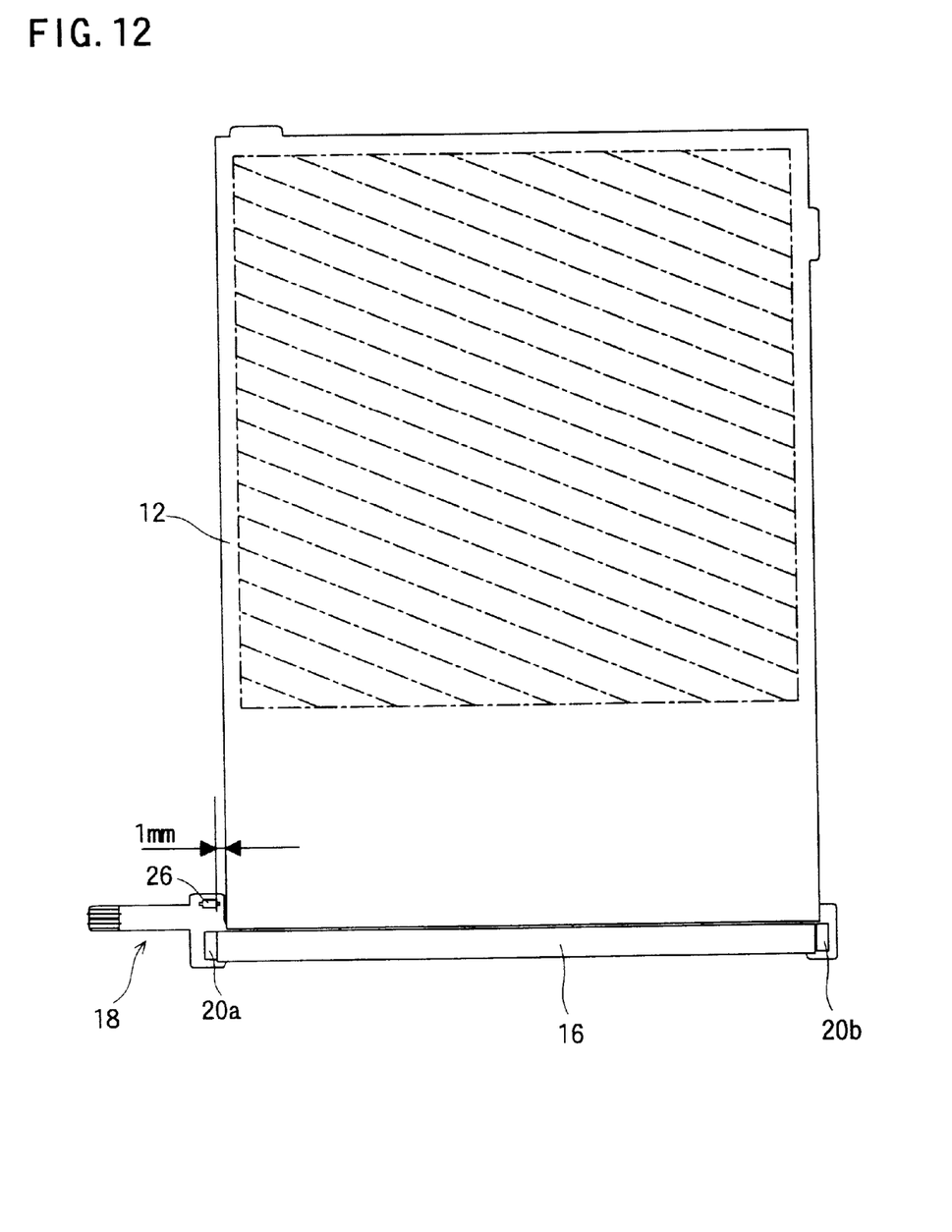
FIG. 12 is an illustrative view showing a physical relationship between the stick type light guide body and a LED.
Figure 13:
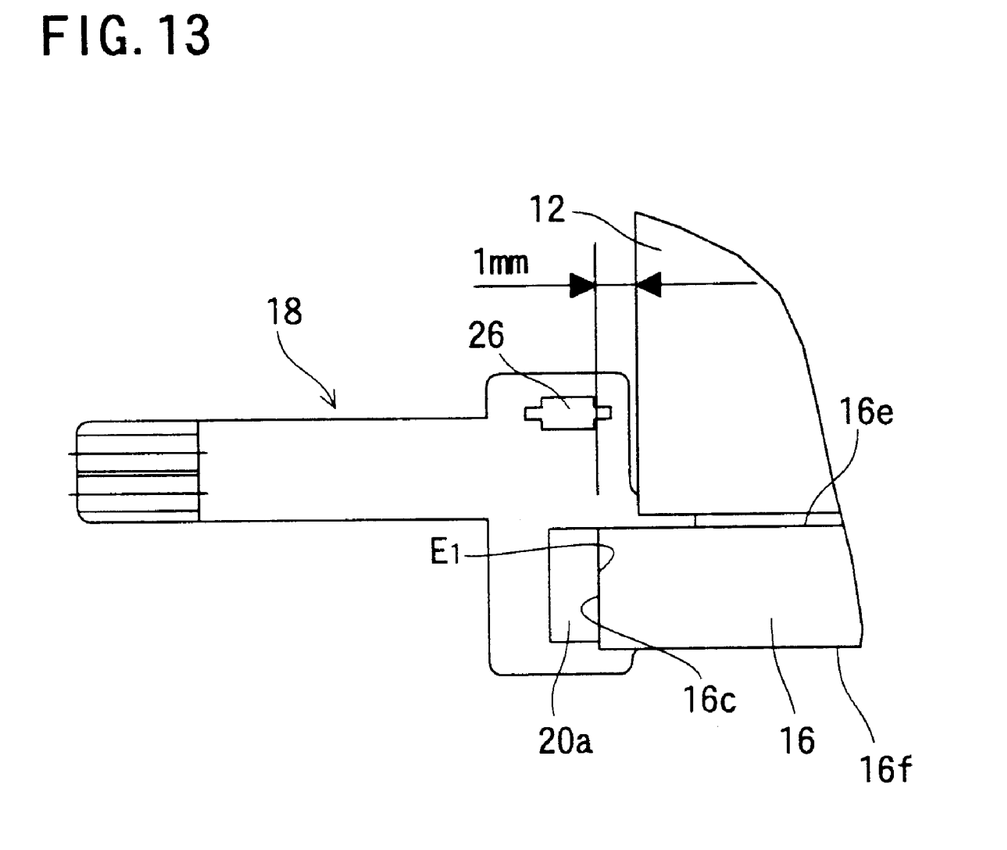
FIG. 13 is another illustrative view showing a physical relationship between the stick type light guide body and the LED.

Upon completion of the mounting, the stick type light guide body 16 is sandwiched between the LEDs 20a and 20b as shown in FIG. 9 and FIG. 12, and the protruding portion 16g is slightly protruding from the lower surface of the substrate 18 through the through hole 18e as shown in FIG. 10 and FIG. 11. The substrate 18 and the stick type light guide body 16 are relatively positioned by the protruding portion 16g and the through hole 18e, thus, allowing the side surface 16c of the stick type light guide body 16 to be brought into close contact with the light emitting surface E1 of the LED 20a as shown in FIG. 13.

After completing the mounting of the reflector 14 on the substrate 18, the light guide plate 12 is mounted on the reflector 14. That is, the light guide plate 12 is inserted from the upper side of the support portions 14d and 14e in such a manner that the side surface 12d is brought into close contact with the side surface 16f of the stick type light guide body 16(the side surface 12d and the side surface 16f is in parallel each other) with the prism surface 12g being upward. As can be understood from FIG. 13, the light emitting surface E1 of the LED 20a is located outside (electrode 22 side) the side surface 12e of the light guide plate 12 by approximately 1 mm. In this manner, the surface lighting device 10 shown in FIG. 1 is obtained.

As understood from the above description, the stick type light guide body 16 receives a light emitted from the light emitting surface E1 of the LED 20a fixed on the substrate 18, and emits from the side surface 16f. The emitted light is incident from the side surface 12d of the light guide plate 12, and emitted from the lower surface 12b through the prism surface 12g constructed by a plurality of linear prisms P. The through hole 18e is formed in the vicinity of the LED 20a on the substrate 18, and the protruding portion 16g is formed on the lower surface 16b in the vicinity of the side surface 16c of the stick type light guide body 16. By fitting the protruding portion 16g into the through hole 18e, the LED 20a and the stick type light guide body 16 are relatively positioned in such a manner that the light emitting surface E1 of the LED 20a and the side surface 16c of the stick type light guide body 16 are brought into close contact with each other.

Figure 4:
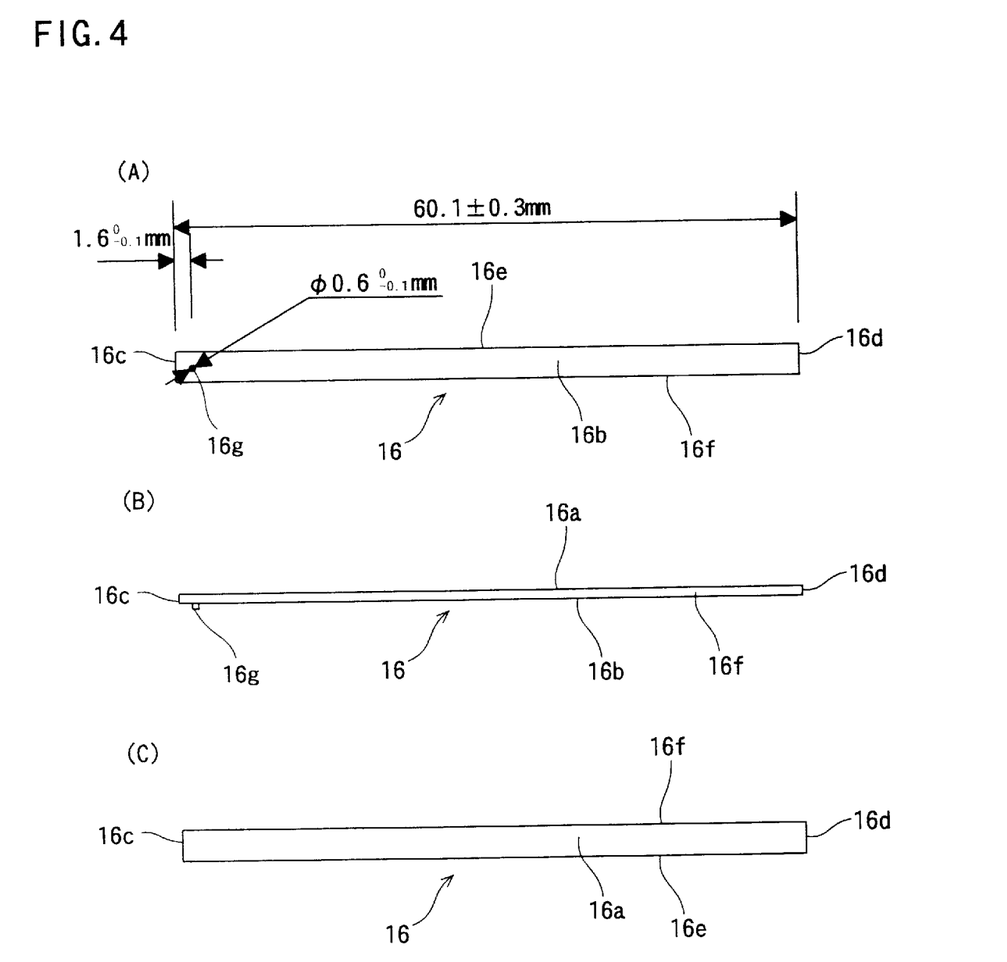
FIG. 4(A) is a lower surface view of the stick type light guide body.
FIG. 4(B) is a side view of the stick type light guide body.
FIG. 4(C) is an upper surface view of the stick type light guide body.

The length of the stick type light guide body 16e has a tolerance of ±0.3 mm as shown in FIG. 4(A), and the distance between the LEDs 20a and 20b also has a tolerance of ±0.3 mm as shown in FIG. 8(C). Furthermore, even if a tolerance is ignored, there has a deviation of 0.2 mm between the length of the stick type light guide body 16e and the distance from the LED 20a to the LED 20b as shown in FIG. 4(a) and FIG. 8(c). Accordingly, if the protruding portion 16g and the through hole 18e are not provided, a maximum gap of 0.8 mm is formed between the light emitting surface E1 of the LED 20a and the side surface 16c of the stick type light guide body 16, causing light leakage from the gap.

In contrast, according to this embodiment, each of the tolerance of the distance from the center of the protruding portion 16g to the side surface 16c of the stick type light guide body 16 and the tolerance of the diameter of the protruding portion 16g is 0.1 mm (referred to FIG. 4(A)). Each of the tolerance of the distance from the center of the through hole 18e to the light emitting surface E1 of the LED 20a and the tolerance of the diameter of the through hole 18e is also 0.1 mm (referred to FIG. 8(C)). Thus, a gap occurring between the light emitting surface E1 of the LED 20a and the side surface 16c of the stick type light guide body 16 is 0.3 mm at the maximum. Accordingly, the gap is narrower than the case the protruding portion 16g and the through hole 18e are not provided, capable of decreasing the occurrence of light leakage.

Meanwhile, since the light emitting surface E1 of the LED 20a is positioned outside (electrode 22 side) the side surface 12e of the light guide plate 12, even if the light leakage occurs from the gap between the light emitting surface E1 and the side surface 16c of the stick type light guide body 16, optical intensity can be decreased by the time the light leakage is reached to the side surface 12e of the light guide plate 12. Thus, an illuminated line appearing on the upper surface 12a of the light guide plate 12 is never outstanding.

It is noted that, in this embodiment, the LED and the stick type light guide body are relatively positioned by the protruding portion and the through hole, thus, capable of decreasing the light leakage. However, it will be appropriate that in place of providing the protruding portion and the through hole, by adding external force (external force toward the LED) to the stick type light guide body by an elastic member such as a blade spring, the gap between the light emitting surface of the LED and the side surface of the stick type light guide body is cleared.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A surface lighting device, comprising:
   a point light source which is fixed on a substrate;
   a stick type light guide body which receives a light emitted from a light emitting surface of said point light source from an end surface in the longitudinal direction and emits the received light from a side surface in the longitudinal direction; and
   a light guide plate which receives the light emitted from said stick type light guide body at a first side surface and emits the received light from an upper surface;
   wherein one of a fitting concave portion and a fitting protruding portion is formed on a predetermined position of said substrate, the other of said fitting concave portion and said fitting protruding portion is formed on a predetermined position of said stick type light guide body, and said point light source and said stick type light guide body are relatively positioned by fitting said fitting protruding portion into said fitting concave portion.

2. A surface lighting device according to claim 1, wherein said fitting concave portion is formed on an upper surface of said substrate, and said fitting protruding portion is formed on the lower surface of said stick type light guide body.

3. A surface lighting device according to claim 1, wherein one of said fitting concave portion and said fitting protruding portion is formed in the vicinity of said point light source, and the other of said fitting concave portion and said fitting protruding portion is formed in the vicinity of said end surface of said light guide body in said longitudinal direction.

4. A surface lighting device according to claim 1, wherein said stick type light guide body is arranged in parallel to said first side surface of said light guide plate, said light guide plate has a second side surface orthogonal to said first side surface in the vicinity of said point light source, and said light emitting surface of said point light source is located outside said second side surface.

5. A surface lighting device according to claim 1, wherein said light guide plate has a second side surface orthogonal to said first side surface in the vicinity of said point light source, and a linear prism being in parallel to a line crossing said first side surface and said second side surface is formed on the upper surface of said light guide plate.

* * * * *